United States Patent [19]
Sommer

[11] Patent Number: 5,535,014
[45] Date of Patent: Jul. 9, 1996

[54] METHOD FOR MAINTAINING A COMMUNICATION LINK WITH A FACSIMILE MODEM

[75] Inventor: Gary W. Sommer, Skokie, Ill.

[73] Assignee: U.S. Robotics, Inc., Skokie, Ill.

[21] Appl. No.: 130,361

[22] Filed: Oct. 1, 1993

[51] Int. Cl.$^6$ .............................. H04N 1/32; H04N 1/327
[52] U.S. Cl. ........................... 358/434; 358/438; 358/442
[58] Field of Search ...................................... 358/437, 431, 358/409, 442, 407, 434, 436, 438, 439, 468

[56] References Cited

U.S. PATENT DOCUMENTS 5,018,022  5/1991  Tatsumi ................................. 358/437

OTHER PUBLICATIONS

Electronics Industry Association/Telecommunications Industry Association "Asynchronous Facsimile DCE Control Standard" (Nov. 1990) (ANSI/EIA/TIA-578-1990; Approved Oct. 22, 1990).
CCITT Recommendation T.30 on "Procedures for Document Facsimile Transmission in the General Switched Telephone Network".
CCITT Recommendation T.4 on "Standardization of Group 3 Facsimile Apparatus for Document Transmission" (Geneva 1980, amended at Malaga–Torremolinos 1984, and Melbourne 1988).

*Primary Examiner*—Scott A. Rogers
*Attorney, Agent, or Firm*—Banner & Allegretti, Ltd.

[57] ABSTRACT

A method for allowing data communication equipment, such as a facsimile modem, to communicate in a more reliable manner with a facsimile machine. The data communication equipment is interconnected to data terminal equipment, such as a personal computer. The data terminal equipment may include an interrupt driver or controller that only periodically directs the data terminal equipment to retrieve message data from memory and forward it, via a serial port, to the data communication equipment. If the interruption in the transmission of characters to the data communication equipment is too long, no data may be sent to the facsimile machine, which may interpret the absence of data as an indication that the communication link has been disconnected and, thus, abort the call. The method includes the steps of monitoring the message data sent to the data communication equipment for an end of line sequence. If no end of line sequence is detected, the line segment of the message data is not transmitted, and a buffering signal, such as string of binary zeros, is sent to the facsimile machine. The buffering signal effectively advises the receiving facsimile machine that the call has not been terminated, even though additional message information is not being sent. When an end of line sequence is eventually detected in the message data from the computer, the line segment of message data may be sent to the facsimile machine.

4 Claims, 3 Drawing Sheets

METHOD FOR MAINTAINING A COMMUNICATION LINK WITH A FACSIMILE MODEM

COPYRIGHT

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

The present invention relates generally to facsimile data communication equipment and, more particularly, to a method for enabling certain data communication equipment, such as a facsimile modem, to transmit in a more reliable fashion serial data from data terminal equipment to facsimile equipment. Data terminal equipment includes, for example, a computer that may, in some instances, be interconnected to a network. Data communication equipment includes, for example, a facsimile modem board that may be interconnected between the computer and a communication medium, such as a telephone line.

The data terminal equipment and data communication equipment must work in harmony to delivery data over the medium to a facsimile machine. Technical standards that allow such equipment to deliver and receive facsimile data have been developed by the Electronics Industry Association (EIA), Telecommunications Industry Association (TIA), and International Consultative Committee on Telephony and Telegraphy (CCITT).

Unfortunately, even upon following such standards, transmissions of message data may be unintentionally aborted. Much data terminal equipment has a single central processing unit ("CPU") or a limited number of CPUs, such that a single CPU, or server CPU, must alternate between doing different tasks. Thus, for example, a driver or controller for a CPU may periodically "interrupt" the CPU from overseeing the transmission of message data from memory to the facsimile modem, where the message data may be sent, via the telephone line, to a facsimile machine. In some cases, a relatively long time elapses from when the CPU stops transferring data from memory to the facsimile modem to when the CPU finishes its alternative tasks and resumes sending data to the facsimile modem.

Such a delay in sending information to the facsimile modem, and, thus, to the facsimile machine, may cause the facsimile machine to "time out." In such a case, the facsimile machine may respond as though the communication link between the facsimile modem and facsimile machine has been severed and terminate the communication link.

The inability of data terminal equipment to transmit data to the data communication equipment fast enough to meet the requirements of the facsimile equipment is aggravated when the data terminal equipment is part of a computer network and controlled by a network driver. The driver may well clear the data terminal equipment interrupts for more than the period required to serially send a character to the data communication equipment. The facsimile machine may interpret the silence, or cessation of the message data stream, as meaning that the transmission has been aborted.

As a result, many transmissions are unnecessarily aborted. An operator may understandably become annoyed upon having to "redial" the facsimile machine and reestablish the communication link to the facsimile machine each time that the data terminal equipment controller interrupts the CPU for too long a period.

SUMMARY OF THE INVENTION

In a principal aspect, the present invention is a method for maintaining a communication link between data communication equipment and facsimile equipment. The method includes the steps of providing a stream of message data along the communication link from the data communication equipment to the facsimile equipment. The message data stream is monitored for a code indicating an end of a line. Unless another line of message data is available to be sent to the facsimile equipment, the data communication equipment transmits a buffer signal, such as a string of binary zeros, to the facsimile equipment. The buffer signal effectively advises the facsimile machine that it should not terminate the communication link, even though additional message data is not being sent.

Thus, an object of the present invention is an improved method for facsimile data communication equipment to maintain a communication link to facsimile equipment. A further object is a method for maintaining such a communication link that is easier to implement and that operates more reliably. These and other objects, features, and advantages of the present invention are discussed or apparent in the following detailed description.

BRIEF DESCRIPTION OF THE DRAWINGS

A preferred embodiment of the present invention is described herein with reference to the drawings wherein.

DETAILED DESCRIPTION OF THE PREFERRED EMBODIMENT

Figure 1:
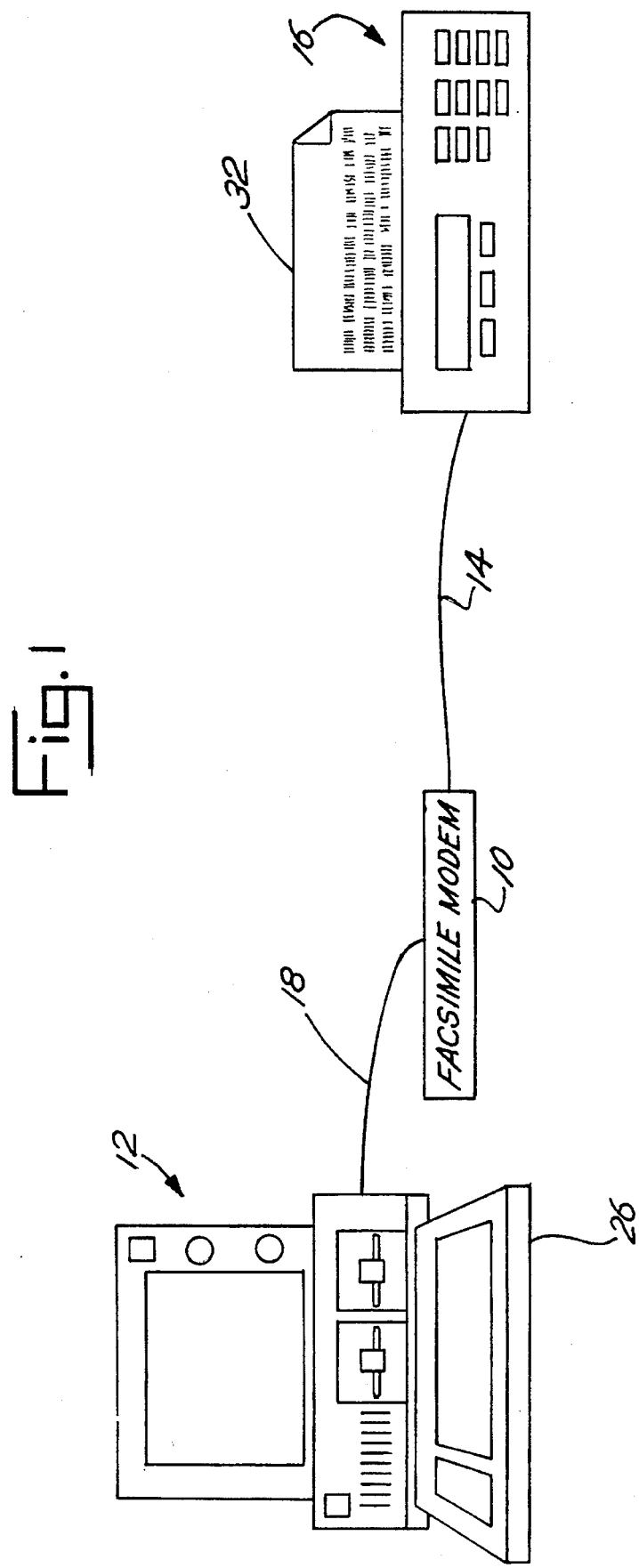
FIG. 1 is a schematic diagram of a facsimile modem that employs the present invention and that is interconnected between data terminal equipment and facsimile equipment.
Figure 2:
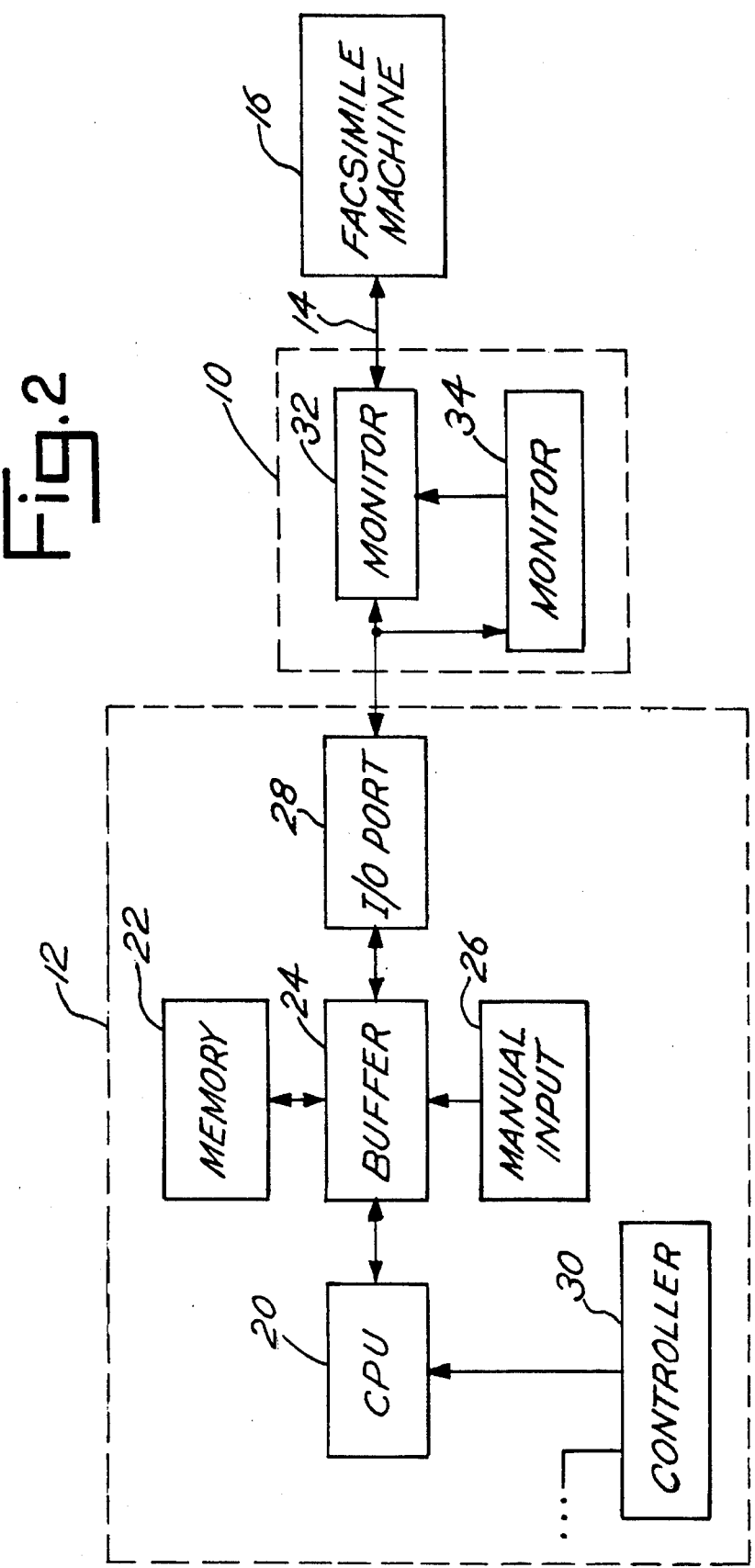
FIG. 2 is a block diagram of the equipment shown in FIG. 1.
Figure 3:
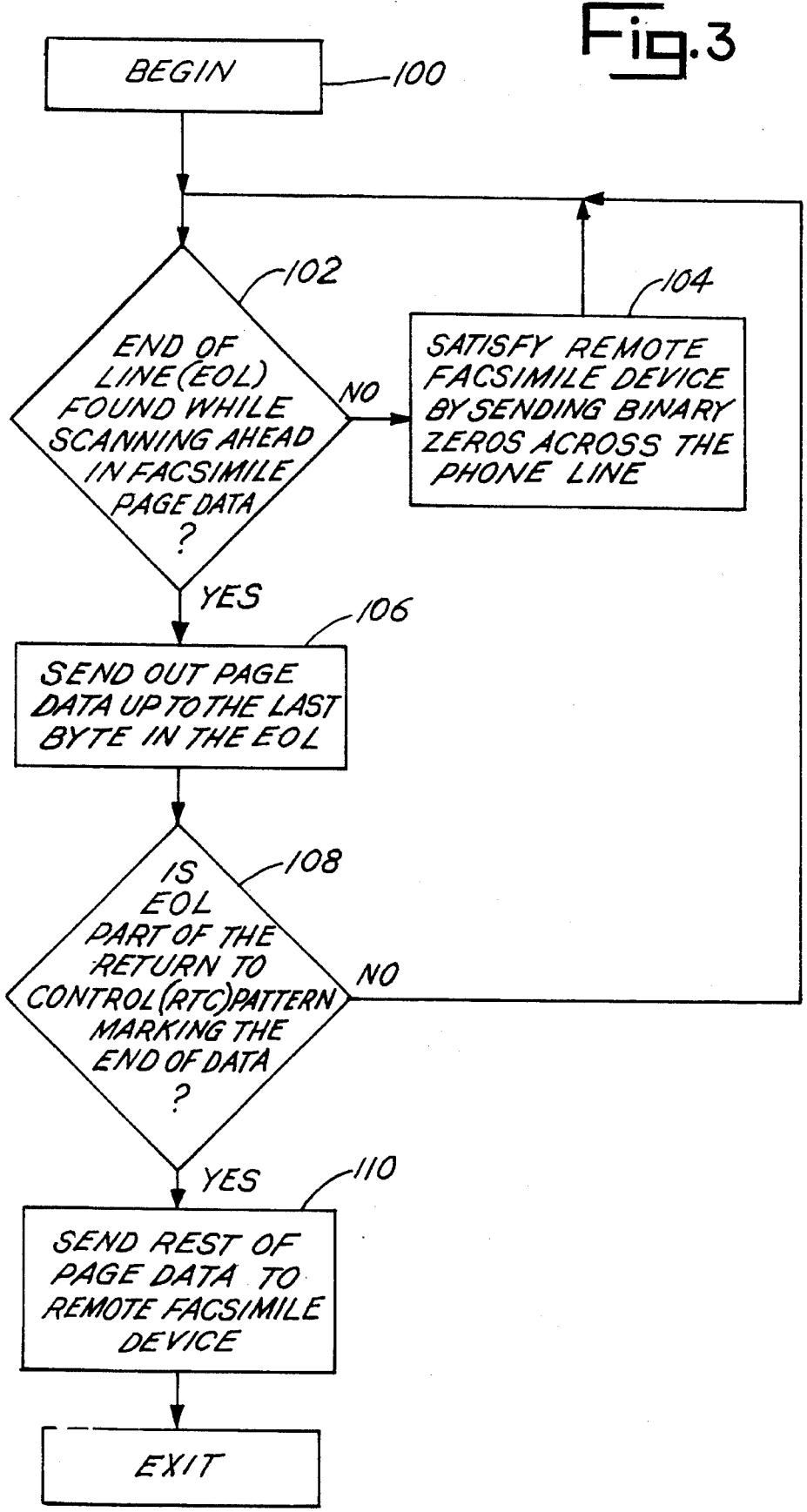
FIG. 3 is a flow chart of a method employed by the facsimile modem shown in FIG. 1.

Referring to FIGS. 1–3, the present invention is a method for allowing facsimile data communication equipment, such as a modem 10, to maintain more reliably a communication link. The facsimile modem 10 receives message data from data terminal equipment, such as a computer 12. The facsimile modem 10 is also interconnected to a communication medium, such as a publicly switched telephone network line 14. The line 14 is also interconnected to facsimile equipment, such as a facsimile machine 16. The facsimile modem 10 may be interconnected to the computer 12 by a serial cable 18.

As shown in FIG. 2, the computer 12 includes a central processing unit ("CPU") 20, memory 22, buffer 24, manual input (such as a keyboard) 26, serial input/output port 28, which is interconnected to the serial cable 18, and controller 30. The CPU 20 controls the flow of message data from the memory 22 to the buffer 24 and input/output port 28. The message data sent to the port 28 is then received by the facsimile modem 10, which converts the message data to an analog format.

The facsimile modem 10 and facsimile machine 16 may establish a communication link over the line 14, such that the message data is transmitted over the line 14 and received by the facsimile machine 16. The facsimile machine 16 then converts the data to a printed message on paper 32. The printed paper message consists of linear sequences of black and white "dots" called picture elements or "pels."

The operation of the CPU 20 is regulated by the controller 30, which may use an interrupt technique to alternatively direct the CPU 20 to different tasks. For example, an operator or user of the computer 12 may provide an appropriate signal, by activating keyboard 26, to advise the CPU 20 that a particular file in the memory 22 should be serially transferred to the facsimile modem 10. The controller 30 may allow the CPU 20 to only periodically oversee the transfer of the message data from the memory 22 to the port 28. If the period of interruption between the transmissions of characters to the port 28 lasts too long, the facsimile modem 10 may have no message data to send to the facsimile machine 16. When no data is sent, the facsimile machine 16 may incorrectly interpret the lack of data as meaning that the communication link has been disrupted. The facsimile machine 16 may then "hang up" or otherwise disconnect the communication link.

A network-based facsimile server, or computer 12, allows facsimiles to be sent from a variety of different computers (not shown), through the facsimile modem 10. Thus, the one facsimile modem 10 may serve many "clients." With many such networks, however, there is a high rate of network interrupts, so that the risk of unnecessarily aborted facsimile transmissions is increased.

The message data from the network or other data terminal equipment may be broken into line segments and page segments. Accordingly, the message data received by the facsimile machine 16 periodically includes an end of line ("EOL") symbol or sequence. The end of line sequence advises the facsimile machine 16 that it should begin printing a new line of pels.

Further, the message data may also include a return to control pattern, which may be recognized by the facsimile machine 16 as indicating that an entire page of message data has been transferred. Thus, the facsimile machine 16 may discontinue further printing on a particular page and start with a separate page of paper before it begins printing again.

Standards for the operation of a system for delivering facsimile messages, as shown in FIG. 1, are described, for example, in published industry standards. See, for example, Electronics Industry Association/Telecommunications Industry Association "Asynchronous Facsimile DCE Control Standard" (November 1990) (ANSI/EIA/TIA-578-1990; Approved Oct. 22, 1990); CCITT Recommendation T.30 on "Procedures for Document Facsimile Transmission in the General Switched Telephone Network"; and CCITT Recommendation T.4 on "Standardization of Group 3 Facsimile Apparatus for Document Transmission" (Geneva 1980, amended at Malaga-Torremolinos 1984, and Melbourne 1988). CCITT Recommendation T.4, for example, sets forth the following information regarding the transmission of message data so that a series of white (i.e. unprinted) or black (i.e. printed) pels may be established on a page.

4.1.1 Data

A line of Data is composed of a series of variable length code words. Each code work represents a run length of either all white or all black. White runs and black runs alternate. A total of [for example] 1728 picture elements represent one horizontal scan line of 215 mm length.

In order to ensure that the receiver maintains colour synchronization, all Data lines will begin with a white run length code word. If the actual scan line begins with a black run, a white run length of zero will be sent. Black or white run lengths, up to a maximum length of one scan line (1728 picture elements or pels) are defined by the code words in Tables 1/T.4 and 2/T.4. The code words are of two types: Terminating code words and Make-up code words. Each run length is represented by either one Terminating code word or one Make-up code word followed by a Terminating code word.

Run lengths in the range of 0 to 63 pels are encoded with their appropriate Terminating code word. Note that there is a different list of code words for black and white run lengths.

Run lengths in the range of 64 to 1728 pels are encoded first by the Make-up code word representing the run length which is equal to or shorter than that required. This is then followed by the Terminating code word representing the difference between the required run length and the run length represented by the Make-up code.

Further standards for the end of line (EOL) code words in the message data, as well as a code for placing a pause in the flow of the message data, are described as follows:

b 4.1.2End-of-line (EOL)

This code word follows each line of Data. It is a unique code word that can never be found within a valid line of Data; therefore, resynchronization after an error burst is possible.

In addition, this signal will occur prior to the first Data line of a page.

Format: 000000000001

4.1.3 Fill

A pause may be placed in the message flow by transmitting Fill. Fill may be inserted between a line of Data and an EOL, but never within a line of Data. Fill must be added to ensure that the transmission time of Data, Fill and EOL is not less than the minimum transmission time of the total coded scan line established in the pre-message control procedure.

Format: variable length string of 0s.

4.1.4 Return to control (RTC)

The end of a document transmission is indicated by sending six consecutive EOLs. Following the RTC [return to code] signal, the transmitter will send the post message commands in the framed format and the data signalling rate of the control signals defined in Recommendation T.30.

Format: 000000000001 . . . 000000000001
(total of 6 times). . .

The preferred embodiment of the present invention requires the data communication equipment to recognize an end of line, or escape, sequence. As discussed above, the end of line sequence comprises a minimum of eleven binary zeros, followed by a binary one, in the encoded message data sent from the computer 22 to the facsimile modem 10.

The facsimile modem 10 continues the flow of message data over the line 14 by inserting a buffer code. The buffer code is a string of additional binary zeros in the encoded end of line sequence found in the stream of message data from the computer 22.

The computer 12 would otherwise effectively "starve" the facsimile modem 10 for data, possibly causing an aborted transmission. Thus, the facsimile modem 10 is able to satisfy the facsimile machine's need to have a continuing supply of data in order to avoid disconnecting the communication link.

In the preferred embodiment, the data communication equipment searches for end of line sequences directly. An alternative embodiment of the invention looks for escape sequences that mark the end of line sequences.

The computer 10 enables the facsimile modem 10 to toggle in and out of a state employing the method of the present invention. The system operator may place in the data stream a command such as AT+FSLB=1 to enable the use of the invention and AT+FSLB=0 to disable the use of the invention.

In the preferred embodiment, the facsimile modem 10 includes a modulator/demodulator (modem) 32 to accept the incoming, digital, message data signals from the computer 12 and transform them to analog signals for the line 14. The facsimile modem 10 further includes a monitor 34 to review the incoming message data signals from the computer 12 and affect the analog message data signals provided by the modem 32 to the facsimile machine 16 along the line 14.

The steps of the method employed by the facsimile modem 10 for maintaining the communication link are shown in FIG. 3. At the beginning of each page of message data, the sequence of steps is initiated at step 100. At step 102, the monitor 34 scans ahead in the message data to detect an end of line sequence in the next line segment of message data sent from the computer 12.

Message data received from the computer 12 after the "last" end of line sequence was received is not sent until another end of line sequence is received. The new line segment of message data is then sent, as a stream of data along the communication link to the facsimile machine 16. However, the complete end of line sequence is not necessarily sent along with the preceding line segment of message data. Rather, at step 104, the monitor 34 instructs the modem 32 to satisfy the facsimile machine's need for additional data by sending binary zeros across the line 14 until a further line segment of message data having an end of line sequence is received from the computer 12.

The binary zeros are a buffer code. The zeros are inserted among the binary zeros of the end of line sequence. In the preferred embodiment, the binary zeros are inserted immediately before the last byte of the end of line sequence.

Accordingly, when an additional segment of message data is received that includes an end of line sequence, the monitor, at step 106, instructs the modem 32 stop transmitting only binary zeros and to transmit the next line segment of the message data received from the computer 12, up to the last byte of the end of line sequence. Thereafter, at step 108, the monitor 34 determines whether the end of line sequence is part of a return to control pattern, marking the end of the message data for a particular page. The return to control pattern includes six end of line sequences that are in series or adjacent each other.

If the return to control pattern, which marks the end of the page in the message data, is found by the monitor, the modem 32 is instructed, at step 110, to send the rest of the message data for the page. Thereafter, steps 100–110 can be repeated for each new page of message data. Otherwise, if at step 108, the monitor 34 determines that the end of line sequence is not part of a return to control pattern, the monitor 34 returns to step 102 and begins scanning the message data, before it is transmitted to the facsimile machine 16, for an end of line sequence. Again, the facsimile modem 10 inserts a string of binary zeros into the end of line sequence (at step 104) until another line segment of message data, having an end of line sequence, is detected.

Thus, the monitor 34 is effectively monitors the stream of data to the facsimile machine 16 and transmits a string of binary zeros, in an end of line sequence, when the computer 12 may have ceased sending message data. The binary zeros are sent when another end of line sequence has not been detected in the next line segment of message data received from the computer.

Although the foregoing description of the preferred embodiment will enable a person of ordinary skill in the art to make and use the invention, the following detailed assembly language listing for an 8088 microprocessor in the facsimile modem 10 is included below. The listing provides detailed information concerning the programming and operation of the overall system. Additional detailed features of the system will become apparent to those skilled in the art from reviewing the program.

Copyright© 1993 U.S. Robotics, Inc.

DSP-SIDE.ASM

Purpose: This 5 member state machine takes data massaged by the DTE side (see DTE-SIDE. ASM) and gives it to the data pump which will modulate the data for the phone line.

The states are called by "eol_load" like:

```
call    word ptr cs:eol_load
``` once every character time.

```
;--------------------------------------------------------------
;eol_load state 1
;Waits for the first eol
;--------------------
eol_start       proc
        cmp     fax_timer,0
        je      es_abort
        cmp     eol_count,0
        jne     es_start
        call    t_load_char
        ret
es_abort:
        mov     fax_result,q_ok
        call    fax_dsp_exit
        ret
es_start:
        mov     eol_load,offset load_till_dle   ;Fall thru to load_till_dle
eol_start       endp
;--------------------
;eol_load - state 2
;--------------------
load_till_dle   proc
```

```
        call    t_load_char
        cmp     al,q_dle
        je      ltd_dle
        clc
        ret
ltd_dle:
        mov     eol_load,offset load_till_z
        clc
        ret
load_till_dle endp
;--------------------
;eol_load - state 3
;--------------------
load_till_z     proc
        mov     eol_load,offset load_till_dle
        call    t_load_char
        cmp     al,'Z'
        jne     ltz_exit
        cmp     al,q_etx
        je      ltz_abort
        test    fax_flags2,(one_sec_bit_flag)   ;was encountered 1sec of nulls?
        jnz     ltz_flush                       ;yes, don't do SLB, flush what
                                                ;you thought is Scan Line
        mov     fax_timer,1000                  ;Reset timer on dle-z
        dec     eol_count
        jnz     ltz_exit
        mov     eol_load,offset eol_wait
        clc
        ret
ltz_flush:
        mov     tvector,offset fd_abort
        clc
        ret
ltz_abort:
        mov     fax_result,q_ok
        call    fax_dsp_exit
ltz_exit:
        clc
        ret
load_till_z     endp
;--------------------
;eol_load - state 4
;--------------------
eol_wait        proc
        mov     al,0
        cmp     fax_timer,0
        je      ew_timeout
        cmp     eol_count,0
        je      ew_exit
        mov     eol_load,offset load_till_dle
        jmp     short load_till_dle
ew_timeout:
        mov     eol_load,offset ew_end
        mov     al,q_dle
ew_exit:
        clc
        ret
eol_wait        endp
;--------------------
eol_load_state 5
;----------
ew_end          proc
        mov     tvector,offset t_load_char
        mov     al,q_etx
        clc
        ret
ew_end          endp
;----------
```

Purpose: This 3 member state machine takes data from the dte and inserts a <DLE>-Z in it so the DSP side (see DSP-SIDE.ASM) can easily locate places to insert nulls when no data is ready to send to the data pump.

The states are called by "input_vector" like:

```
        call    word ptr cs:input_vector
``` once every character time.

```
;----------------------------------------------------------------
;This state of input vector searches for an etx in the data
;--------------------
etx_hunt    proc
    push    ax
    call    eol_hunt
    pop     ax
    cmp     al,03h
            ;Check for an etx
    je      eh_etx
    mov     input_vector,offset dle_hunt
    jmp     t_store_char
eh_etx:
    add     eol_count,1
    mov     input_vector,offset t_store_char    ;Reset iv after dle etx
    jmp     t_store_char
etx_hunt    endp
;--------------------
;This routine is used by the above states of input vector to scan the fax data for 11 zeros
;and a one for eol's
;--------------------
eol_hunt    proc
    mov     ah,9
eh_loop:
    dec     ah
    jz      eh_exit
    shr     al,1
    jc      eh_one
    inc     zcount                              ;Increment count for number of zeros
    jnz     eh_loop                             ;Back to top if wrap didn't occur
    dec     zcount                              ;Otherwise keep count at 255
    jmp     short eh_loop
eh_one:
    cmp     zcount,11                           ;Is it 11 or above
    mov     zcount,0
    jb      eh_loop
    mov     al, 10h                             ;The dsp side scans for dle-z on
    call    t_store_char                        ;a character basis so that it doesn't
    mov     al,'Z'                              ;have to do this bit wise eol scanning
    call    t_store_char
    inc     eol_count
eh_exit:
    ret
eol_hunt    endp
;--------------------
;This state of input vector searches for dle's in the data
;--------------------
dle_hunt    proc
    push    ax
    call    eol_hunt
    pop     ax
    cmp     al,10h                              ;Check for a DLE
    je      dh_dle
    jmp     t_store_char
dh_dle:
    mov     input_vector,offset etx_hunt
    jmp     t_store_char
dle_hunt    endp
;----------------------------------
```

A preferred embodiment of the present invention has been described herein. It is to be understood, of course, that changes and modifications may be made in the preferred embodiment without departing from the true scope and spirit of the present invention, as defined by the appended claims.

I claim:

1. A method for data communication equipment to transmit message data from data terminal equipment to facsimile equipment, said message data including an end of line sequence and a return to control pattern to mark and end page segment and said data terminal equipment serially providing said message data to said data communication equipment said method comprises the steps of:

establishing a communication link between said data communication equipment and facsimile equipment;

monitoring said message data from said data terminal equipment for said end of line sequence and responsibly transmitting said message data upon detecting said end of line sequence;

transmitting a buffer code to said facsimile machine before completely transmitting said end of sequence line;

monitoring a second line segment of said message data from said data terminal equipment for a second end of line sequence;

continuing to transmit said buffer code until such second end of line sequence is detected and responsively transmitting said second line segment of said message data upon detecting said second end of sequence;

analyzing said message data adjacent to each said end of line sequence to determine whether said end of line sequence is included in said return to control pattern, and responsively transmitting said page segment of said message data upon determining that said end of line sequence is included in said return to control pattern.

2. A method for data communication equipment to transmit message data from data terminal equipment to facsimile equipment, said message data including an end of line sequence and a return to control pattern to mark an end of a page segment and said data terminal equipment serially providing said message data to said data communication equipment, comprising, for each page segment of said message data, the steps of:

establishing a communication link between said data communication equipment and facsimile equipment;

detecting a first end of line sequence in said message data;

transmitting a string of binary zeros to said facsimile equipment before completely transmitting said first end of line sequence to said facsimile equipment;

monitoring a second line segment of said message data from said data terminal equipment for a second end of line sequence and continuing transmitting said string of binary zeros to said facsimile equipment until said second end of line sequence is detected;

transmitting said second line segment of message data upon detecting said second end of line sequence; and analyzing said message data adjacent each said end of line sequence to determine whether said end of line sequence is included in said return to control pattern and responsively transmitting said page segment of said message data upon determining said end of line sequence is included in said return to control pattern.

3. The method of claim 2 wherein the data terminal equipment is a computer.

4. The method of claim 2 wherein the data terminal equipment is a network-based facsimile server.

* * * * *